United States Patent
Gutierrez

(10) Patent No.: US 10,329,942 B2
(45) Date of Patent: Jun. 25, 2019

(54) APPARATUS USING MAGNETS FOR HARVESTING ENERGY ON A METROLOGY DEVICE

(71) Applicant: Natural Gas Solutions North America, LLC, Houston, TX (US)

(72) Inventor: Francisco Manuel Gutierrez, League City, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 195 days.

(21) Appl. No.: 15/407,109

(22) Filed: Jan. 16, 2017

(65) Prior Publication Data
US 2018/0202309 A1    Jul. 19, 2018

(51) Int. Cl.
| | |
|---|---|
| F01D 15/10 | (2006.01) |
| G01F 3/10 | (2006.01) |
| G01F 1/05 | (2006.01) |
| F01D 5/06 | (2006.01) |
| F01D 21/00 | (2006.01) |
| F03G 7/00 | (2006.01) |
| F03G 7/08 | (2006.01) |
| F03B 13/00 | (2006.01) |
| G01F 15/06 | (2006.01) |
| H02K 21/22 | (2006.01) |
| H02K 7/18 | (2006.01) |

(52) U.S. Cl.
CPC .............. *F01D 15/10* (2013.01); *F01D 5/06* (2013.01); *F01D 21/003* (2013.01); *F03B 13/00* (2013.01); *F03G 7/00* (2013.01); *F03G 7/08* (2013.01); *G01F 1/05* (2013.01); *G01F 3/10* (2013.01); *G01F 15/06* (2013.01); *H02K 7/1807* (2013.01); *H02K 21/22* (2013.01); *F05B 2220/20* (2013.01); *F05B 2220/602* (2013.01); *F05B 2240/20* (2013.01); *F05B 2250/312* (2013.01); *Y02B 10/50* (2013.01); *Y02E 10/28* (2013.01)

(58) Field of Classification Search
None
See application file for complete search history.

(56) References Cited

U.S. PATENT DOCUMENTS

| | | |
|---|---|---|
| 3,581,566 A | 6/1971 | Goff et al. |
| 5,199,307 A | 4/1993 | Onada et al. |
| (Continued) | | |

FOREIGN PATENT DOCUMENTS

WO    2014081919 A1    5/2014

OTHER PUBLICATIONS

EP Search Report for corresponding EP Application No. 18151387.01 dated Jun. 14, 2018.

*Primary Examiner* — Harshad R Patel
(74) *Attorney, Agent, or Firm* — Paul Frank + Collins P.C.

(57) ABSTRACT

An apparatus comprising a meter device with a rotating component configured to rotate in response to a flowing fluid, an indexing unit coupled with the meter device and configured to process signals from the meter device resulting in values for measured parameters of a flowing fluid, and an energy harvester coupled to the pair of impellers, the energy harvester comprising a first harvesting unit and a second harvesting unit that co-operate to generate an electrical signal, the first harvesting unit configured to co-rotate with the pair of impellers, the second harvesting unit comprising a hollow, magnetic core disposed proximate the first harvesting unit.

20 Claims, 12 Drawing Sheets

(56) References Cited

U.S. PATENT DOCUMENTS

| | | | | |
|---|---|---|---|---|
| 6,089,102 | A * | 7/2000 | Bloss | B67D 7/20 |
| | | | | 702/46 |
| 6,196,065 | B1 * | 3/2001 | Henksmeier | B67D 7/16 |
| | | | | 222/71 |
| 6,523,427 | B1 | 2/2003 | Ferguson | |
| 6,886,414 | B2 | 5/2005 | Gutierrez et al. | |
| 7,523,660 | B2 * | 4/2009 | Albrecht | G01F 3/10 |
| | | | | 73/261 |
| 2004/0206174 | A1 | 10/2004 | Gutierrez et al. | |
| 2006/0032303 | A1 * | 2/2006 | Smich | G01F 3/10 |
| | | | | 73/261 |
| 2009/0126478 | A1 * | 5/2009 | Moilanen | G01D 5/145 |
| | | | | 73/261 |
| 2010/0199758 | A1 * | 8/2010 | Tokhtuev | G01F 3/10 |
| | | | | 73/261 |
| 2011/0074231 | A1 * | 3/2011 | Soderberg | H01F 3/10 |
| | | | | 310/44 |
| 2012/0091832 | A1 * | 4/2012 | Soderberg | C08J 3/00 |
| | | | | 310/44 |
| 2012/0122629 | A1 | 5/2012 | Akatsu et al. | |
| 2014/0319927 | A1 * | 10/2014 | Cho | H02J 50/40 |
| | | | | 307/104 |
| 2017/0126087 | A1 * | 5/2017 | Soderberg | H02K 21/042 |

* cited by examiner

APPARATUS USING MAGNETS FOR HARVESTING ENERGY ON A METROLOGY DEVICE

BACKGROUND

Engineers expend great efforts to make devices easy to assemble, reliable to operate, and amenable to maintenance and repair tasks. Hardware constraints can frustrate these efforts because the hardware lacks appropriate functionality and because any improvements can increase costs and/or add complexity to the device. For metrology, the hardware (e.g., gas meters) often suffers from a dearth of power or power generating sources that are resident on the device.

SUMMARY

The subject matter of this disclosure relates to metrology and metrology hardware. Of particular interest herein are improvements that harvest energy from metering systems, for example, flow meters and the like devices that measure parameters of flowing fluids. These improvements may incorporate an energy harvester to allow the metering system to generate power in situ so as to power on-board electronics, often to replace, supplement, or charge a power source found on-board the metering system.

Flow meters may find use in billing applications to charge an end user for fuel (e.g., natural gas). Utility companies may rely on values from the flow meter to assign a monetary value to charge the customer. The values may also serve in custody transfer applications, which transfer fluids (e.g., natural gas, oil, etc.) from a supplier to a recipient, to account for the amount of fluid that transfers between these operators.

Some embodiments incorporate an energy harvester that can generate power via operation of the flow meter. The energy harvester may incorporate magnetic devices that cooperate with one another to harvest energy from rotating elements. These devices may include a magnetic core with a wire wound circumferentially about its outside. The magnetic core may reside in a ring magnet that co-rotates with the rotating elements. In use, the rotating ring magnet sets up an alternating magnetic field that induces a signal (e.g., current) in the wire.

Some embodiments address a braking effect that has been found to occur in magnet-type energy harvesters. Braking is due to the magnetic attraction between the poles of the ring magnet and the core. In devices with solid cores, it has been found that braking can lead to inaccurate measurements and interrupt rotation of the rotating elements for devices with sold cores. For example, braking increases the minimum flow necessary to start rotation because the breakaway torque increases due to the magnetic attraction between the solid core and the ring magnet. Minimum flow to stop rotation also increases for the same reason.

Accuracy of flow meters is a function of speed of a defined volume moving through the device and, also, fluid temperature and pressure in the line (which is corrected to standard conditions). Fluid temperature may be measured at the meter. But fluid pressure is seldom measured because it is known elsewhere in the line and assumed constant. In this regard, braking of the rotating elements may inadvertently introduce a pressure drop across the device that was not accounted for that will cause the resulting flow calculation to produce an error.

Some embodiments use "hollow" cores in place of the solid core. As discussed more below, harvesting devices that use the hollow core may be more reliable because the hollow core is much less susceptible to braking effects. Similarly situated devices with hollow cores may also provide more power because the hollow cores can be longer than solid cores, which are likely shorter in length in order to reduce (or eliminate) the braking effect and concomitant loss of accuracy and interruptions in operation. The shorter solid cores increase the gap or distance between the ends of the solid core and the poles of the rotating magnet to reduce braking effect. But, notably, the hollow core improves efficacy of the energy harvester relative to the shorter solid core because the longer hollow core can accommodate more windings of the wire that can lead to greater power generation.

Use of the energy harvester may address certain drawbacks of the on-board power source. For example, using the energy harvester to re-charge or reduce duty cycle on the on-board power source may preclude maintenance necessary to check and replace batteries and battery packs found on devices in the field. For gas meters, this feature can save significant costs of labor because these devices can number in the hundreds and thousands in the field and, moreover, often reside in remote areas, both of which may present major logistical challenges that require careful planning. The on-board energy harvester can also improve reliability in the event that batteries die unexpectedly or suffer reduction or total loss of energy prematurely, which is a significant nuisance and unplanned expense for the operator.

On-board energy harvesting that is reliable can also address future power needs for gas meters and related metrology devices. For gas meters, the energy harvester may provide sufficient power to meet future data transmission demands that would otherwise exceed the on-board power source by, for example, drawing an unreasonable amount of power from an on-board battery or energy storage unit. On-board energy harvesting can also allow gas meters to expand functionality, for example, in the form of new electronics and sensors including transmitting devices to communicate with a Supervisory Control and Data Acquisition (SCADA) system, cloud-connected product life-cycle management software, and the like. In use, duty cycle for transmitting data may be periodic, which would elevate power demand for brief periods of time. More demanding scenarios might require real-time data transmission to monitor ongoing device health or diagnostics in a connected system, which may require almost-continuous supply of reliable power on the device.

The subject matter of this application may relate to commonly owned U.S. Pat. No. 6,886,414, filed on Apr. 21, 2003, and entitled "POWER GENERATING METER."

BRIEF DESCRIPTION OF THE DRAWINGS

Reference is now made briefly to the accompanying figures, in which.

Figure 1:
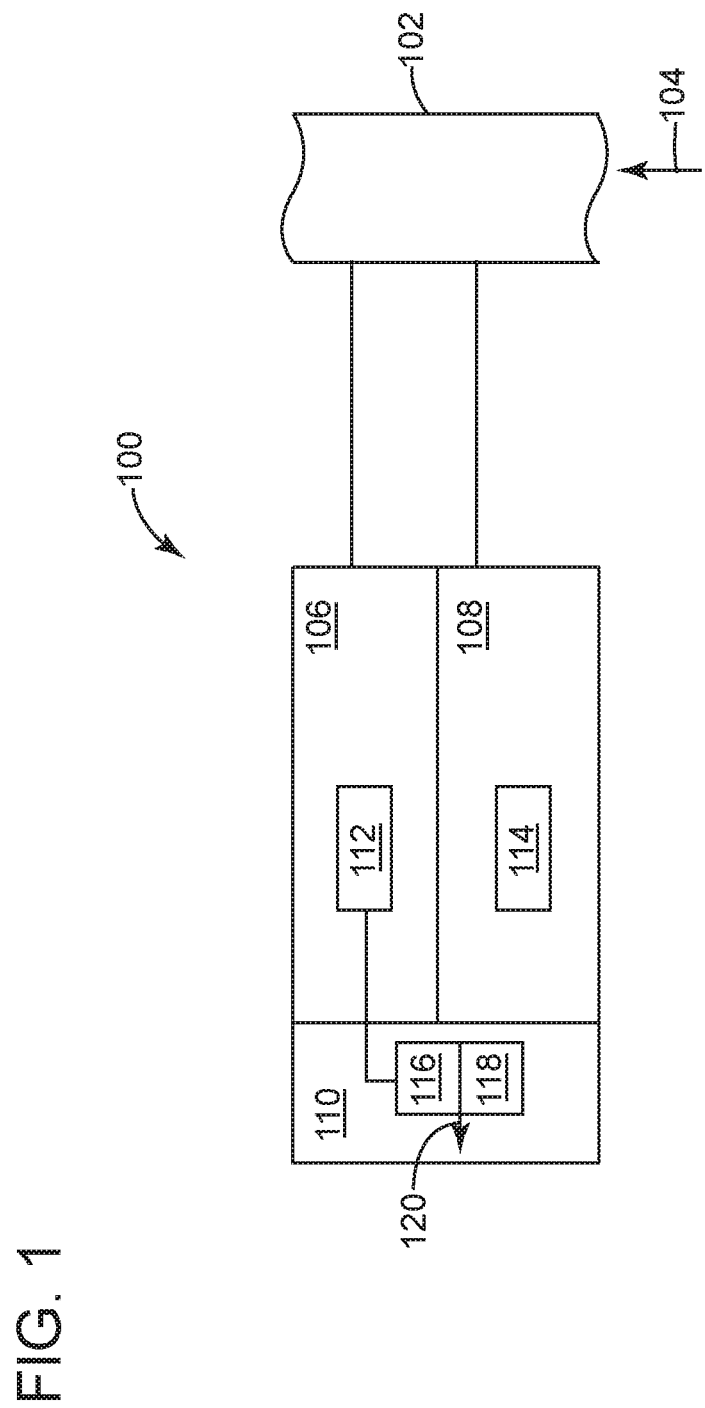
FIG. 1 depicts a schematic diagram of an exemplary embodiment of a metering system that is configured for in situ energy harvesting.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The embodiments disclosed herein employ structure to harvest energy in situ on gas meters and related metrology devices. These devices may quantify parameters (e.g., flow rate, volume, etc.) of fluids and solids, for example, using electro/mechanical means with rotating elements (e.g., impellers) that can generate pulses indicative of the flow. As described below, embodiments may employ magnetic devices that cooperate to generate power in response to rotation of the rotating elements on the device. These embodiments may use a hollow, tubular member (or "core"), however, which proves advantageous to reduce braking and other deleterious effects brought on by interaction with a rotating magnet in these types of devices. Other embodiments are within the scope of the subject matter of this disclosure.

FIG. 1 depicts a schematic diagram of an exemplary embodiment of a metering system 100. This embodiment may couple with a conduit 102 that carries material 104. Examples of material 104 may include fluids (e.g., liquids and gases), but metering system 100 may also work with solids as well. The metering system 100 may integrate several components (e.g., a first component 106, a second component 108, and a third component 110). The components 106, 108 may operate together to convey information that relates to material 104. This information may define measured parameters for material 104, for example, flow rate, volume, and energy; however, this listing of parameters is not exhaustive as relates to applications of the subject matter herein. The third component 110 can operate to harvest energy that might otherwise be lost during operation of the metering system 100. This harvested energy may find use to power components (e.g., electronics) on the metering system 100.

As noted herein, the metering system 100 may embody a gas meter or like metrology hardware. This type of hardware may be configured to measure defined volumes of flowing gas. These measurements can be used to quantify (and often bill) consumers at residential, commercial, industrial, and municipal locations, but this does not foreclose use of the energy harvesting concepts on other hardware or for other applications. In one implementation, the first component 106 (also "metrology component 106") may include a meter device 112 with a rotating component, for example co-rotating impellers, configured to rotate in response to the material (104). Although shown separate from the conduit 102, the meter device 112 may be configured to connect to the conduit 102, often in-line using flanges or fittings that are common for pipe connections. The second component 108 (also, "processing component 108") may include an indexing unit 114 that can process signals from the meter device 112. These processes may calculate values for the measured parameters among other functions. As also shown, the third component 110 (also, "energy harvester 110") may couple with the meter device 112. The energy harvester 110 may have a bifurcated structure with a pair of harvesting units (e.g., a first harvesting unit 116 and a second harvesting unit 118). The harvesting units 116, 118 can communicate with one another without physical contact, preferably to create a signal 120 in response to movement of elements of the meter device 112. The units 116, 118 may leverage a variety of technologies including photoelectric, inductive, capacitive, and ultrasonic technologies. Other technologies developed after filing of this application may also be acceptable for use in the metering system 100.

Figure 2:
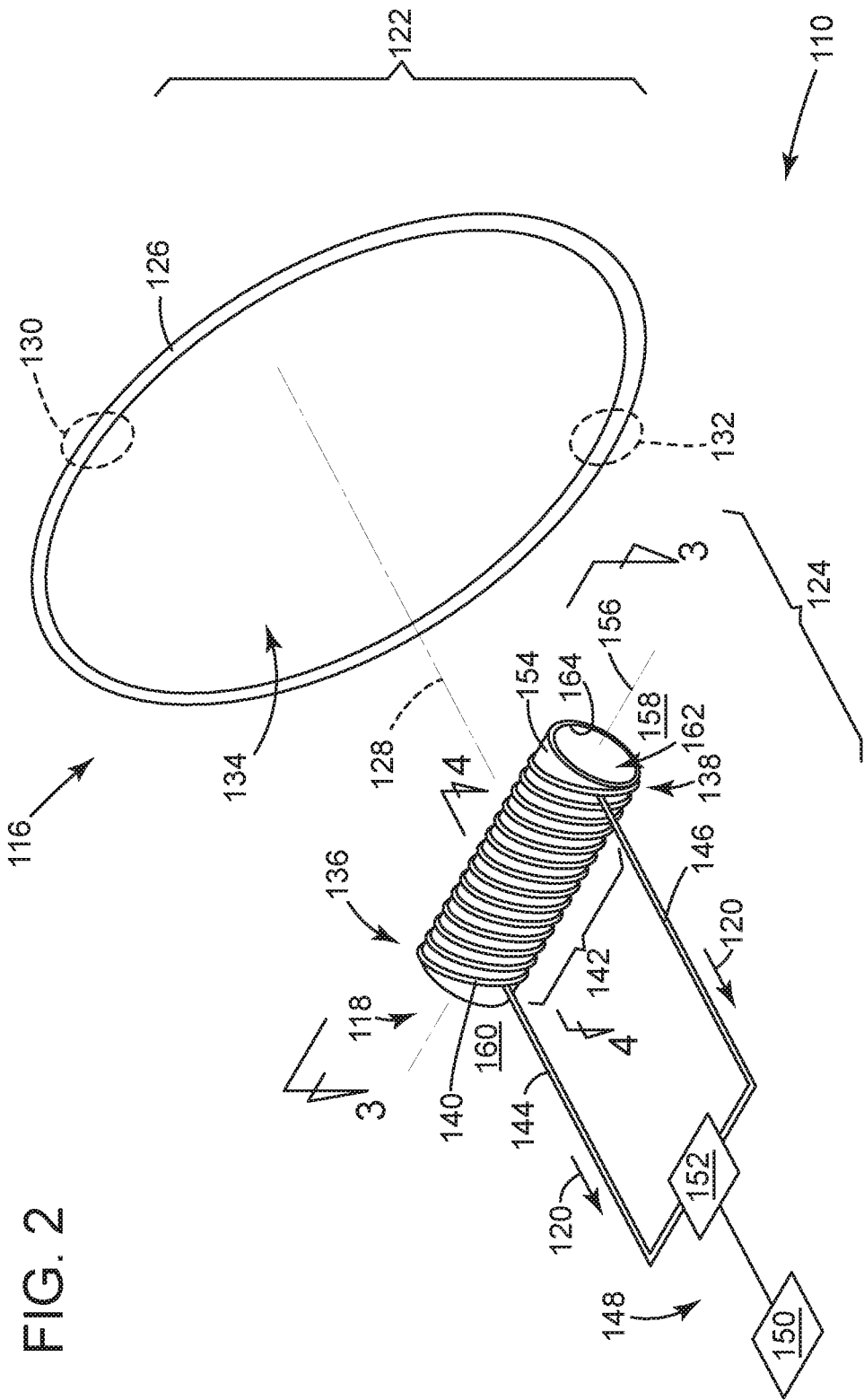
FIG. 2 depicts an exploded perspective view of an exemplary structure for an energy harvester for use in the metering system of FIG. 1.

FIG. 2 illustrates an exemplary structure for the energy harvester 110 in partially-exploded form. The harvesting units 116, 118 may embody magnetic units (e.g., a first magnetic unit 122 and a second magnetic unit 124). The magnetic units 122, 124 can generate a magnetic field F, preferably as permanent magnets or continuous magnetic sources. On the first harvesting unit 116, the first magnetic unit 122 may form an annular ring 126 with a center axis 128. The annular ring 126 may have magnetic poles (e.g., first pole 130 and a second pole 132) diametrically opposed from one another across an opening 134. Construction of the annular ring 126 may include additional magnetic poles that are dispersed about the device. The second magnetic unit 124 may itself comprise constituent components, shown here as a conductor 136 and a core 138. The conductor 136 may embody a thin-diameter wire 140 forming windings 142 that circumscribe the core 138. The windings 142 may couple with one or more leads (e.g., a first lead 144 and a second seal 146). The leads 144, 146 may extend to electronics 148 found on-board the metering system 100 (FIG. 1). The electronics 148 may include devices 150 and operative circuitry 152. Exemplary devices 150 may include sensors, micro-controllers and related processors; however, the metering system 100 (FIG. 1) may also benefit from on-board energy storage units (e.g., rechargeable batteries). The core 138 may have a body 154 with a longitudinal axis 156 that extends between a pair of ends (e.g., a first end 158 and a second end 160). A bore 162 may penetrate into the body 154 along the longitudinal axis 156 to form a peripheral wall 164.

Figure 3:
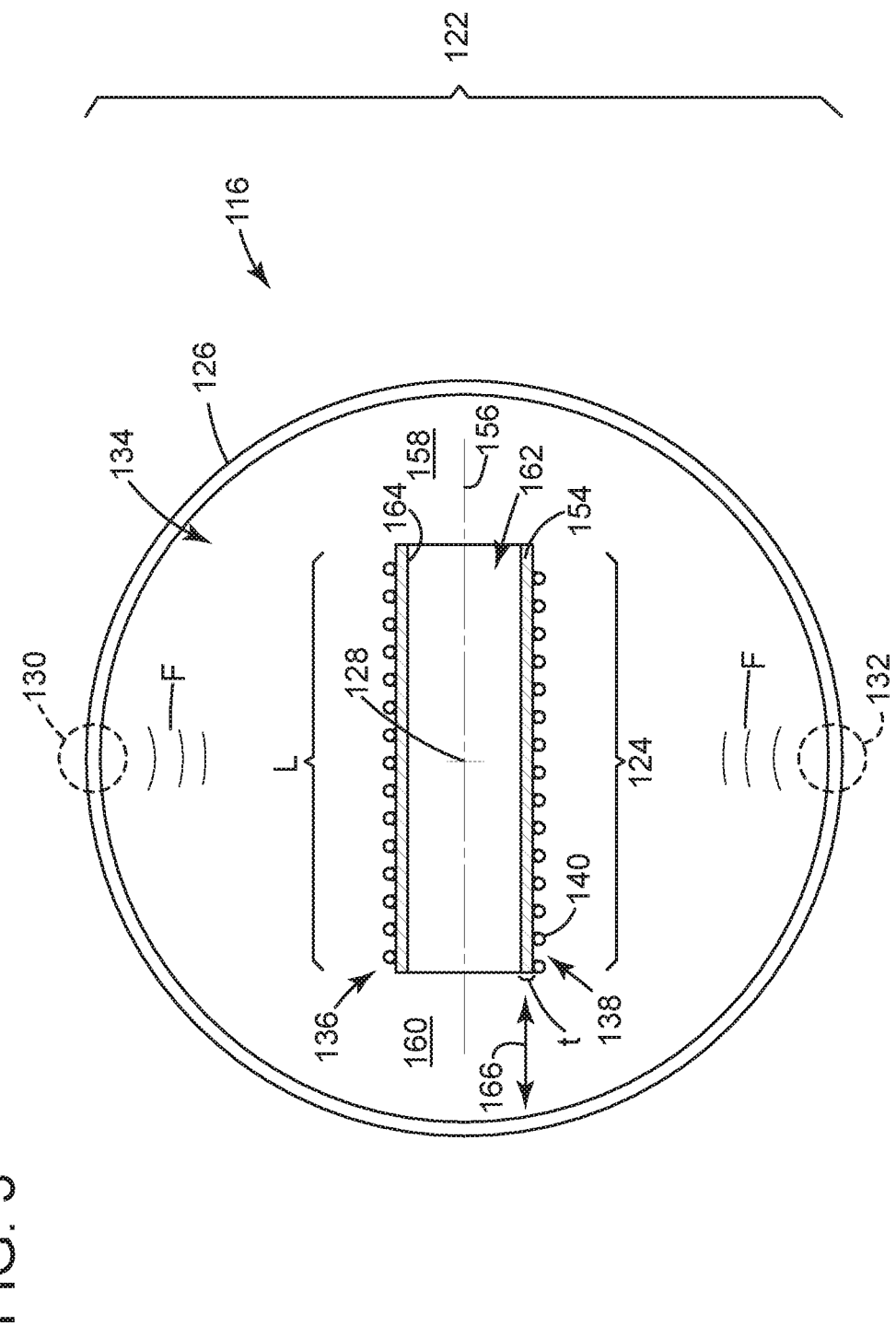
FIG. 3 depicts an elevation view of the partial cross-section of the energy harvester of FIG. 2.

FIG. 3 depicts an elevation view of a partial cross-section of the energy harvester 110 taken at line 3-3 of FIG. 2. As shown, the bore 162 may extend through the body 154. This feature creates a "hollow" structure in the form of an elongate tube with openings at the ends 158, 160. Form factors for the body 154 may include cylinders, as shown, but other form factors with different cross-sections (e.g., square, rectangle, elliptical, ovoid, etc.) may comport with the proposed concepts as well. In one implementation, the body 154 measures approximately 8 mm in length (L), although the length L may fall within a range of from approximately 7 mm to approximately 9 mm. The peripheral wall 164 may have a wall thickness (t) in a range of from approximately 0.5 mm to approximately 1.6 mm. The wire 140 may be formed from 47 gauge copper wire. Windings 142 may form approximately 12,500 turns or coils about the core 138; however, the number of turns may vary to maximize or optimize functioning of the device, for example, from approximately 8,000 to approximately 14,000. When assembled, the core 138 may reside inside the opening 134 at an orientation with the longitudinal axis 156 that is radially offset from the center axis 128. The radial offset may be 90° so that the axes 128, 156 are perpendicular to one another, as shown. This orientation may form a gap 166 between the ends 158, 160 and the interior surface of the annular ring 126. This disclosure does contemplate configurations in which the radial offset is such that the longitudinal axis 156 aligns with the center axis 128.

With reference also to FIG. 2, the exemplary structure for the energy harvester 110 may generate the signal 120 in response to relative movement between the units 122, 124. In use, rotation of the annular ring 126 changes the annular position of the poles 130, 132 around the center axis 128. The motion sets up an alternating magnetic field that induces signal 120 in the wire 140, typically as a sinusoidal alternating current ("SAC"). Leads 144, 146 may conduct the SAC to the electronics 148 for use by devices 150. Operative circuitry 152 may be useful to convert the SAC to direct current (DC) that is better suited for devices 150. The operative circuitry 152 may include one or more discrete electrical components like a rectifier for this purpose.

The "hollow" body 154 of the core 138 has been found to improve performance of the harvesting component 110. The design is less susceptible to "braking" that may occur as the poles 130, 132 of the rotating annular ring 126 pass in close proximity to the ends 158, 160 of the body 154. In turn, the length L of body 154 can be set to maximize the number of windings 142 of the conductor 136. This feature permits the harvesting component 110 to more effectively generate the SAC. As an example, Table 1 below compares power achieved from a "solid" core design and the power achieved from the "hollow" body 154 disclosed herein.

TABLE 1

| Rotation Speed | Power Comparison | |
| --- | --- | --- |
| | "Solid" Core | "Hollow" Core |
| 200 RPM | 670 μWatts | 840 μWatts |
| 300 RPM | 1,320 μWatts | 1650 μWatts |
| 400 RPM | 2,370 μWatts | 2960 μWatts |
| 500 RPM | 3,760 μWatts | 4700 μWatts |
| 600 RPM | 5,290 μWatts | 6610 μWatts |
| 700 RPM | 6,970 μWatts | 8710 μWatts |
| 800 RPM | 8,380 μWatts | 10,470 μWatts |
| 900 RPM | 10,820 μWatts | 13,520 μWatts |
| 1000 RPM | 13,910 μWatts | 17,390 μWatts |
| 1100 RPM | 16,520 μWatts | 20,650 μWatts |
| 1200 RPM | 18,920 μWatts | 23,650 μWatts |
| 1300 RPM | 23,330 μWatts | 29,160 μWatts |
| 1400 RPM | 25,500 μWatts | 31,880 μWatts |
| 1500 RPM | 29,150 μWatts | 36,420 μWatts |
| 1600 RPM | 33,300 μWatts | 41,620 μWatts |
| 1700 RPM | 36,240 μWatts | 45,300 μWatts |
| 1800 RPM | 38,750 μWatts | 48,430 μWatts |
| 1900 RPM | 41,360 μWatts | 51,700 μWatts |
| 2000 RPM | 43,530 μWatts | 54,410 μWatts |
| 2100 RPM | 46,020 μWatts | 57,520 μWatts |

TABLE 1-continued

| Rotation Speed | Power Comparison | |
| --- | --- | --- |
| | "Solid" Core | "Hollow" Core |
| 2200 RPM | 49,300 μWatts | 61,620 μWatts |
| 2500 RPM | 55,430 μWatts | 69,290 μWatts |

The power output of the "hollow" structure of the body 154 is seen in Table 1 to be significantly greater, up to 25%, effectively maximizing the available space within the similar-sized envelope as compared to the "solid" core design. By way of comparison, the spacing or gap distance of a prior art solid core sensor was approximately 0.030 inches less on each end, resulting in significantly less coils (approximately 2000 less turns) and less power generation.

Figure 4:
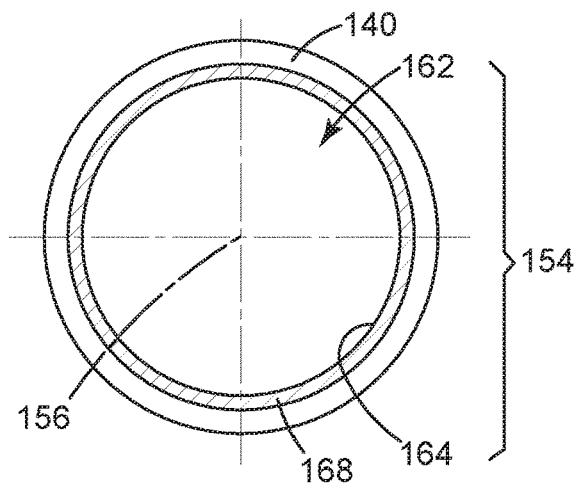
FIG. 4 depicts an elevation view of the partial cross-section of the energy harvester of FIG. 2.

FIG. 4 depicts an elevation view of the cross-section of the energy harvester 110 taken at line 4-4 of FIG. 2. Generally, the peripheral wall 164 may embody a thin-walled structure 168 that comprises materials with properties suitable to function as part of the energy harvester 110. Exemplary materials include steel, although a variety of metals and metallic composites may be useful as well. Likewise, material composition for the thin-walled structure may or may not be homogeneous throughout. Machining techniques like turning and milling may be used to form the form factor with bore 162.

Figure 5:
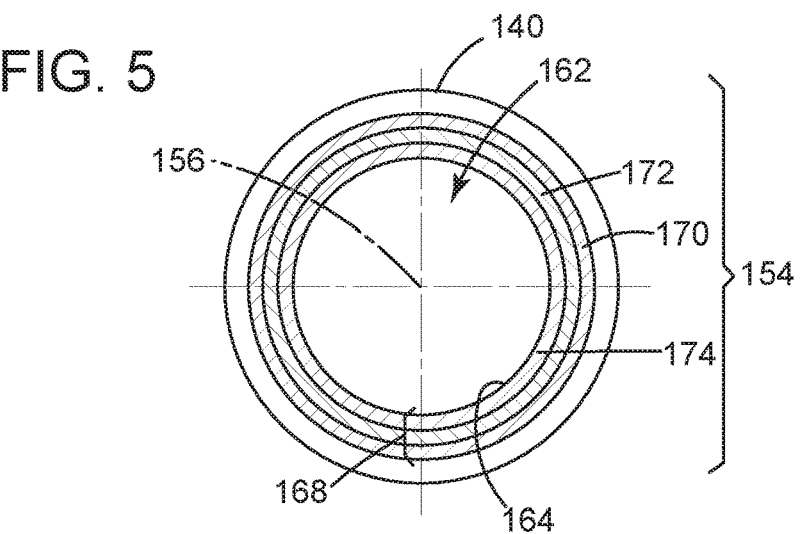
FIG. 5 depicts an elevation view of the partial cross-section of the energy harvester of FIG. 2.
Figure 6:
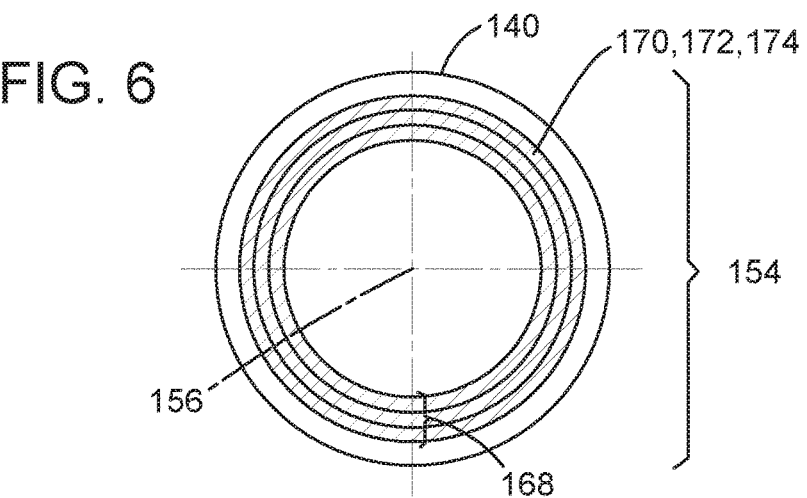
FIG. 6 depicts an elevation view of the partial cross-section of the energy harvester of FIG. 2.

FIGS. 5 and 6 depict an elevation view of the cross-section of exemplary configurations for the thin-walled structure 168 of the energy harvester 110. In FIG. 5, the configuration leverages multiple layers (e.g., a first layer 170, a second layer 172, and a third layer 174). The layers 170, 172, 174 may form a laminate structure that features sheets of material wrapped circumferentially about the longitudinal axis 156 or, possibly, individual hollow cylinders of varying diameters. Adhesives may attach the layers 170, 172, 174 together to form the thin-walled structure 168. In operation, materials selection may set the amount of energy available from each of the layers 170, 172, 174. The SAC that the energy harvester 110 generates will correspond with the sum of that generated by each layer 170, 172, 174. In FIG. 6, the configuration assumes a spiral design that forms the layers 170, 172, 174 contiguously or at least semi-contiguously with one another. This spiral design may result from winding one or more sheets of material about the longitudinal axis 156.

Figure 7:
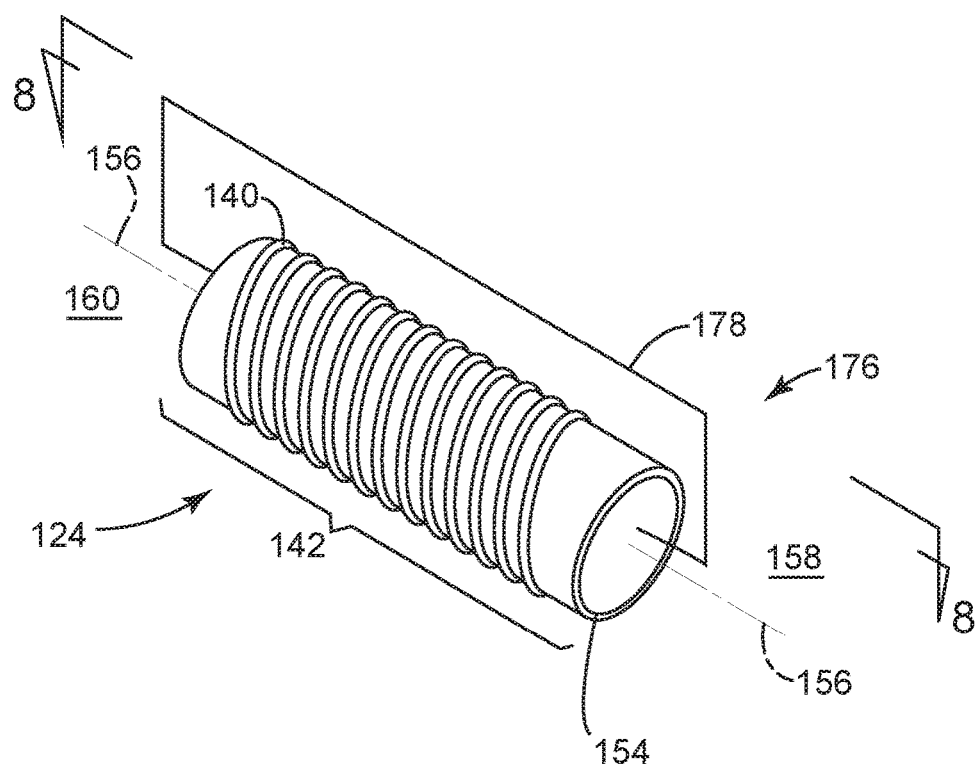
FIG. 7 depicts a perspective view of an example of the energy harvester of FIG. 2.

FIG. 7 depicts a perspective view of an example of the second magnetic unit 124 for use in the energy harvester 110 of FIG. 2. At a high level, the magnetic field F may be represented by magnetic flux lines that extend between the ends 158, 160 of the body 154. The density of these flux lines typically decreases with radial distance away from the body 154. As shown in FIG. 7, a field shaper 176 may be useful to shape or manipulate the flux lines to increase power generation of the harvesting component 110. The field shaper 176 may comprise a bent wire 178, typically copper wire or other conductive metals. The bent wire 178 assumes a position on the device to collapse the flux lines closer to or in proximity of the vicinity of the windings 142. This structure may increase the magnetic flux density to increase power generated by the harvesting component 110.

Figure 8:
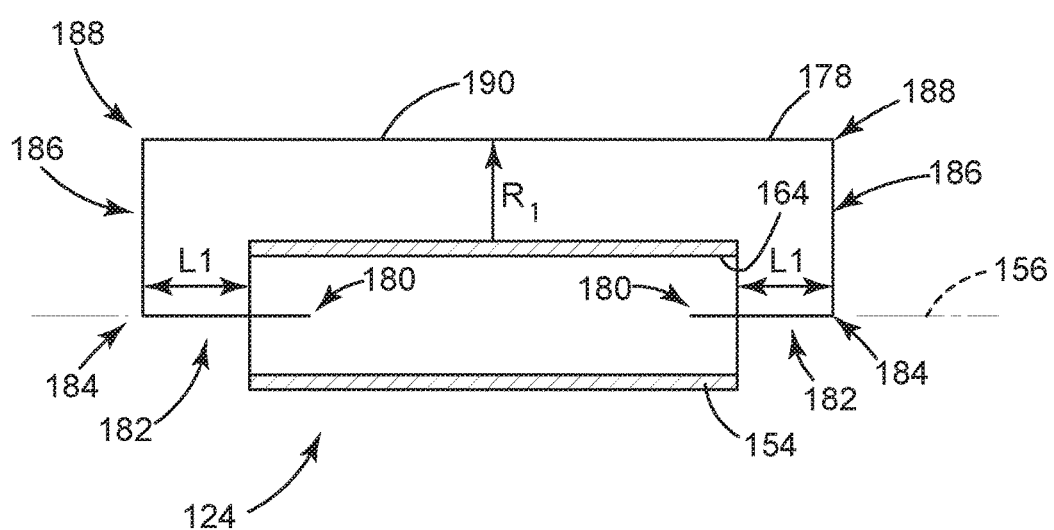
FIG. 8 depicts an elevation view of the cross-section of the energy harvester of FIG. 7.

FIG. 8 depicts an elevation view of the cross-section of the second magnetic unit 124 taken at line 8-8 of FIG. 7. The bent wire 178 may have ends 180 disposed in the bore 162. The ends 180 are spaced apart from one another and from the peripheral wall 164. Potting or insulation may be useful to retain the ends 180 in position relative to the body 154. The bent wire 178 may have a unitary structure with bends that form segments at varying orientations relative to the longitudinal axis 156. In one implementation, the segments may include a pair of short, longitudinal segments 182 that extend longitudinally away from the ends 180. The segments 182 may terminate at first bends 184 to give way to a pair of radial segment 186 disposed at or near 90° to the longitudinal axis 156. Each of the segments 186 may terminate at a pair of second bends 188 that couple with an elongate longitudinal segment 190, possibly parallel to the longitudinal axis 156. Each of the radial segments 186 may be offset from the ends 158, 160 by a distance $L_1$, which may be in a range of from approximate 1 mm to approximately 5 mm. The longitudinal segment 190 may be offset from the surface of the body 154 by a distance $R_1$, which may be in a range of from approximately 1 mm to approximately 10 mm.

Figure 9:
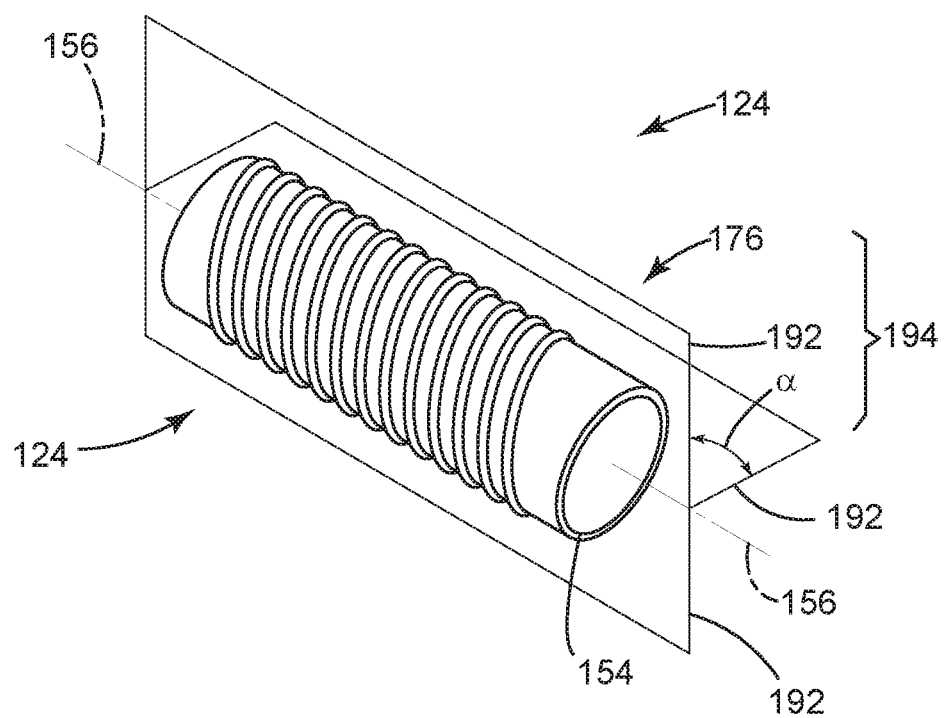
FIG. 9 depicts a perspective view of an example of the energy harvester of FIG. 2.

FIG. 9 depicts a perspective view of an example of the second magnetic unit 124 for use in the energy harvester 110 of FIG. 2. In this example, the field shaper 176 comprises a plurality of shaping members 192 disposed in an array 194. The shaping members 192 may be radially spaced apart from one another by an angle α, preferably so that the members 192 are equally spaced circumferentially apart from one another about the longitudinal axis 156. In one implementation, each of the shaping members 192 may conform to the shape of the bent wire 178 (FIGS. 7 and 8). The number of shaping members 192 may be determined by the practical limits of manufacturing, or by the practical aspect of diminishing returns, whereby increasing the number of shaping member 192 beyond a high limit results in decreasing performance.

Figure 10:
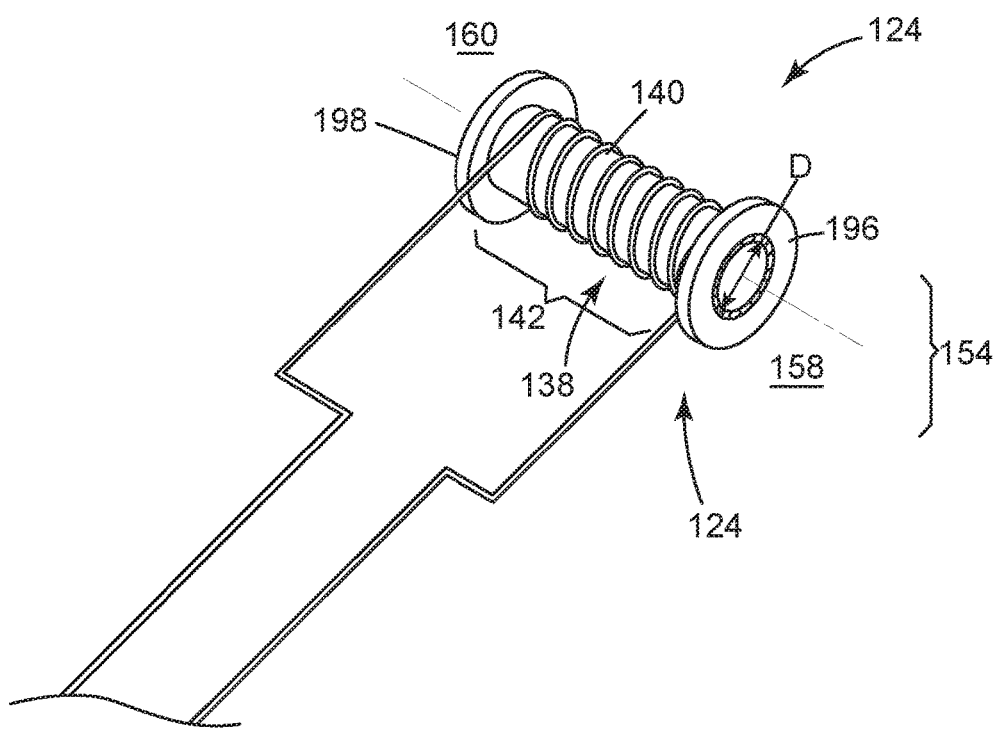
FIG. 10 depicts a perspective view of an example of the energy harvester of FIG. 2.

FIG. 10 depicts a perspective view of another example of the second magnetic unit 124. The field shaper 176 may comprise a pair of magnetic end caps (e.g., a first end cap 196 and a second end cap 198). The end caps 196, 198 reside on each end 158, 160 of the body 154. The end caps 196, 198 may be useful to reshape the magnetic field density around the center of the core 138. The diameter of the end caps 196, 198 may be sized greater than the effective diameter D of the core 138, where the effective diameter D is the diameter of the body 154 plus windings 142. In one example, the diameter of the end caps 196, 198 is between 10% and 100% greater than the effective diameter, although the diameter may also be 20% to 50% greater than the effective diameter.

Figure 11:
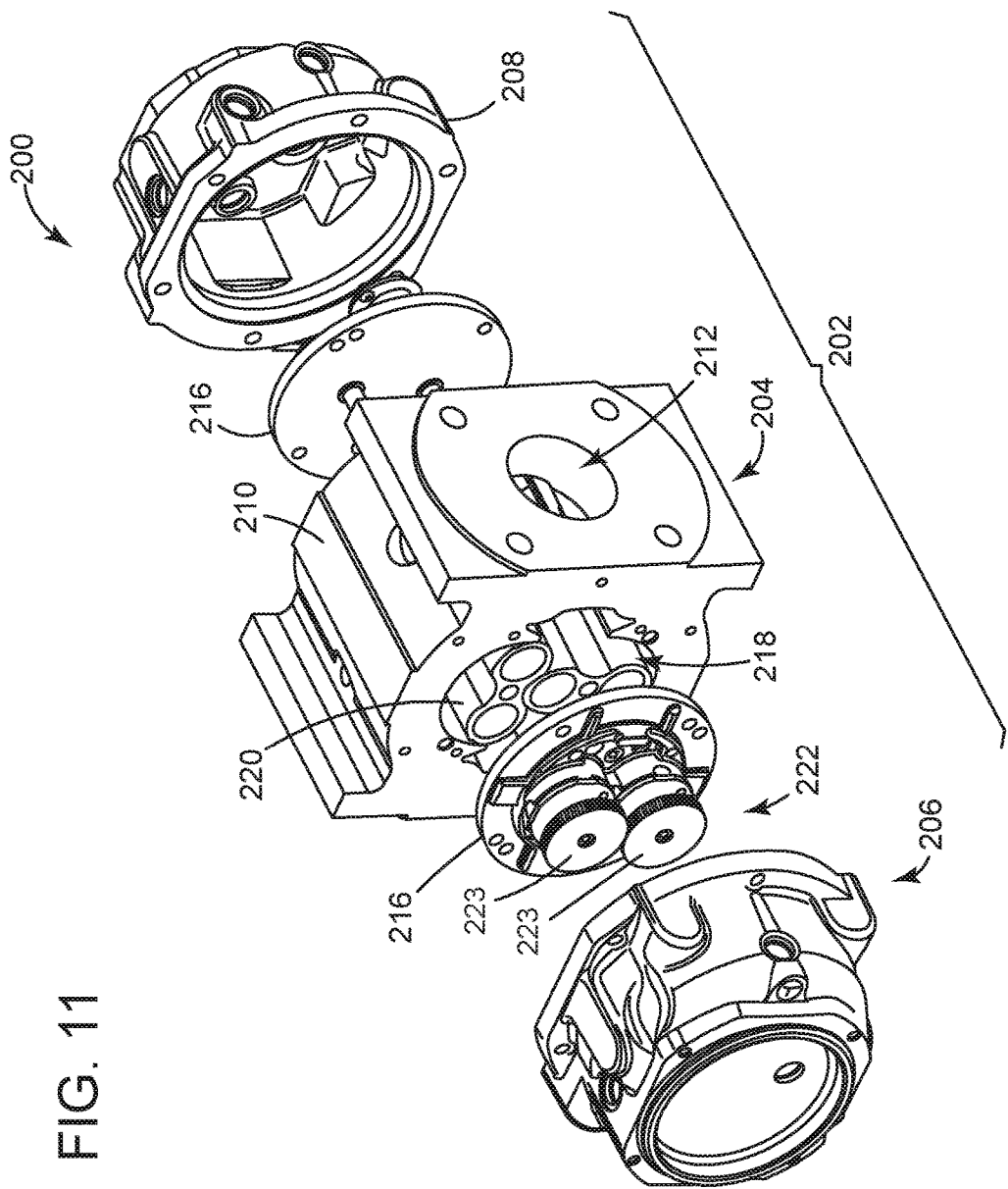
FIG. 11 depicts a perspective view of the front of an example of structure for a metering system.
Figure 12:
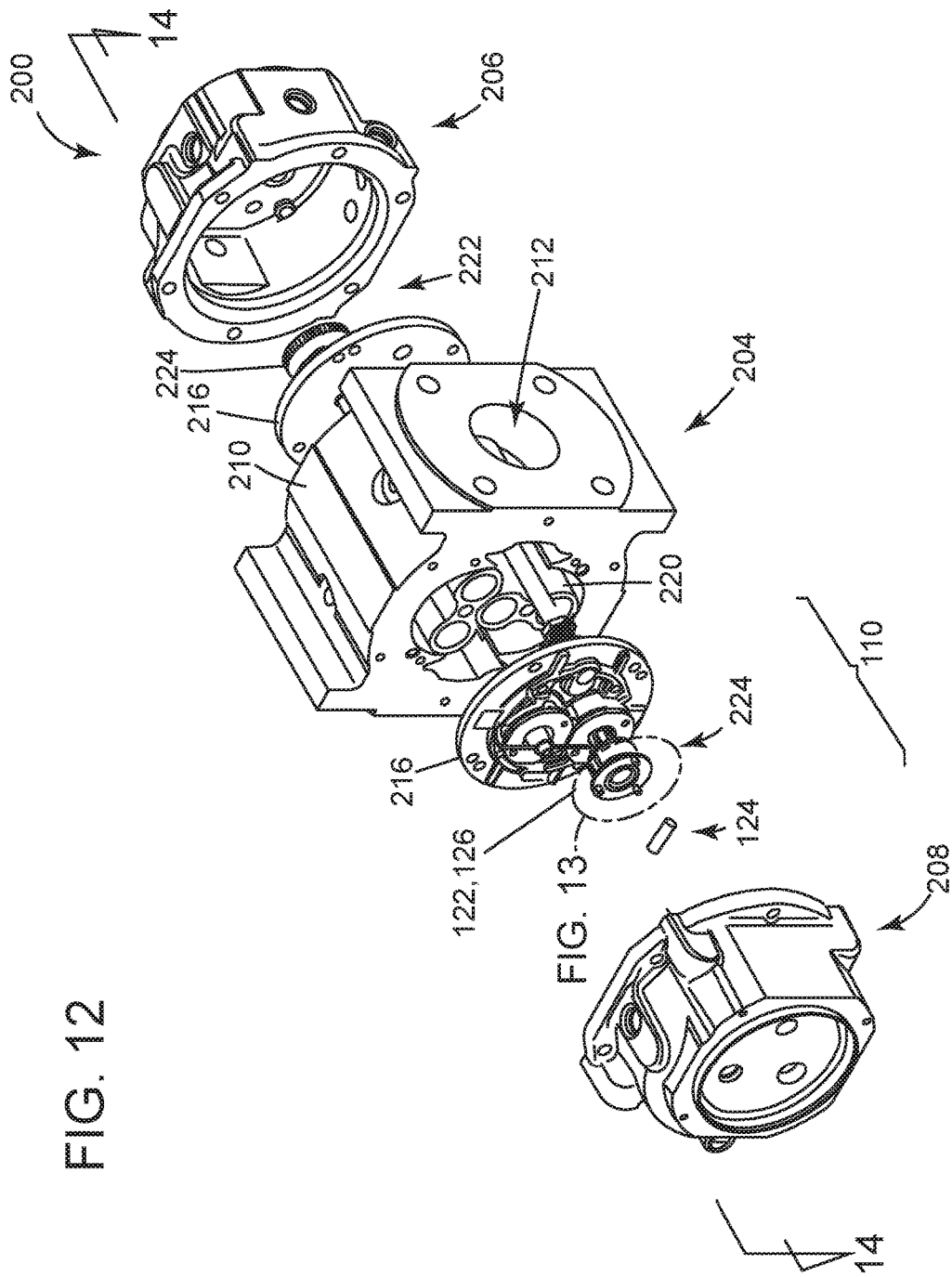
FIG. 12 depicts a perspective view of the back of the example of FIG. 11.

FIGS. 11 and 12 depict a perspective view of an exemplary structure 200 for the metering system 100 from the front (FIG. 11) and the back (FIG. 12), each in partially-exploded form. Starting with the front view of FIG. 11, the structure 200 may include a meter body 202 having a central cylinder 204 and a pair of covers (e.g., a first cover 206 and a second cover 208) that attach to opposing ends. The central cylinder 204 may form a fluid coupling 210 with inlet/outlets 212. The inlet/outlets 212 may interface with the conduit 102 (FIG. 1) to allow material 104 (FIG. 1) to transit the interior of the central cylinder 204. The meter device 112 may comprise a mechanical assembly, shown here having cylinder cover plates 216 that secure on opposite sides of the fluid coupling 210. The cover plates 216 enclose and seal an inner cavity 218 on the fluid coupling 210 that houses impellers 220. On the front end, the mechanical assembly may also include a gear assembly 222 having a pair of gears 223. The gears 223 can couple with the impellers 206, typically by way of one or more shafts that extend through the first cover plate 206 to engage with the impellers 220.

The impellers 220 work in concert to displace a fixed volume of material 104 that transits the fluid coupling 210 between inlet/outlets 212. In one implementation, the impellers 220 counter-rotate in response to flow of material 104 (FIG. 1). The rate at which the impellers 220 rotate relates to the rate at which material 104 flows through the fluid coupling 210. For many applications, the rate of rotation of the impellers 220 is directly proportional to the flow rate of material 104 (FIG. 1) through the fluid coupling 210 so that with each full revolution of the impellers 220 and, in turn, corresponding impeller shafts, a precise volume of material 104 (FIG. 1) moves through the meter body 202. In use, flow volume can be ascertained by counting the revolutions of the impeller shafts, typically by way of the gear assembly 222 and related counting technology of the mechanical assembly.

The back view of FIG. 12 shows generally the hardware that may implement the harvesting component 110 on the structure 200. On the back end, the structure 200 may include a harvester assembly 224 with a bifurcated structure having parts configured to permit relative movement between the magnetic units 122, 124. For rotation, the parts may couple with impellers 220, preferably by way of one or more shafts that extend through the cover plate 216. These rotating parts may support the first harvesting unit 116 so that the annular ring 126 can co-rotate with the impellers 220. The parts of the harvester assembly 224 may also secure the second harvesting unit 122 in proximity to the annular ring 126, as described herein.

Figure 13:
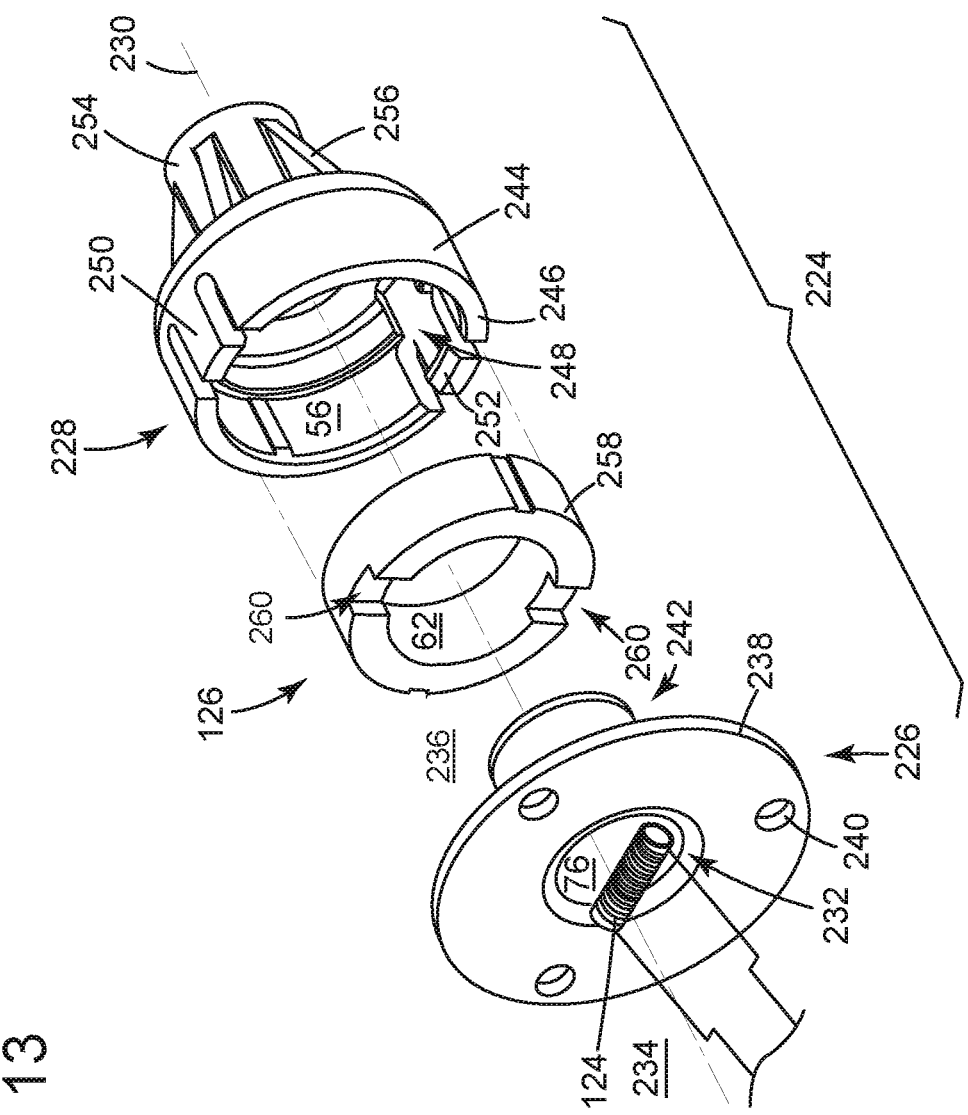
FIG. 13 depicts a perspective view of details of the example of FIG. 12.

FIG. 13 shows a perspective view of details of the harvester assembly 224 of the structure 200 of FIG. 12 in exploded form. The harvester assembly 224 may include a mounting bracket 226 and an extension cup 228. Both parts may align co-axially with one another on an axis 230. The mounting bracket 226 may have a central aperture 232 extending between a first end 234 and a second end 236. On the first end 234, the mounting bracket 226 may form a flange 238 with openings 240 dispersed circumferentially about the axis 230. The second end 236 may form a cup portion 242 having a reduced diameter relative to the diameter of the flange 238. Proximate the cup portion 242, the extension cup 228 may have a receiving part 244 with a peripheral outer wall 246 that bounds an inner opening 248. The peripheral outer wall 246 may include one or more flexible tabs (e.g., first flexible tab 250 and second flexible tab 252), shown here dispersed diametrically opposite one another. In one implementation, the extension cup 228 may reduce in diameter from peripheral outer wall 246 to a tapered section 254 with support ribs 256 disposed circumferentially from a shoulder portion to an outer surface. The annular ring 126 may be configured as a short, cylindrical magnet 258 having detents 260 disposed diametrically opposite from one another. The detents 260 may penetrate the magnet 258 a depth suitable to interface with the flexible tabs 250, 252.

Figure 14:
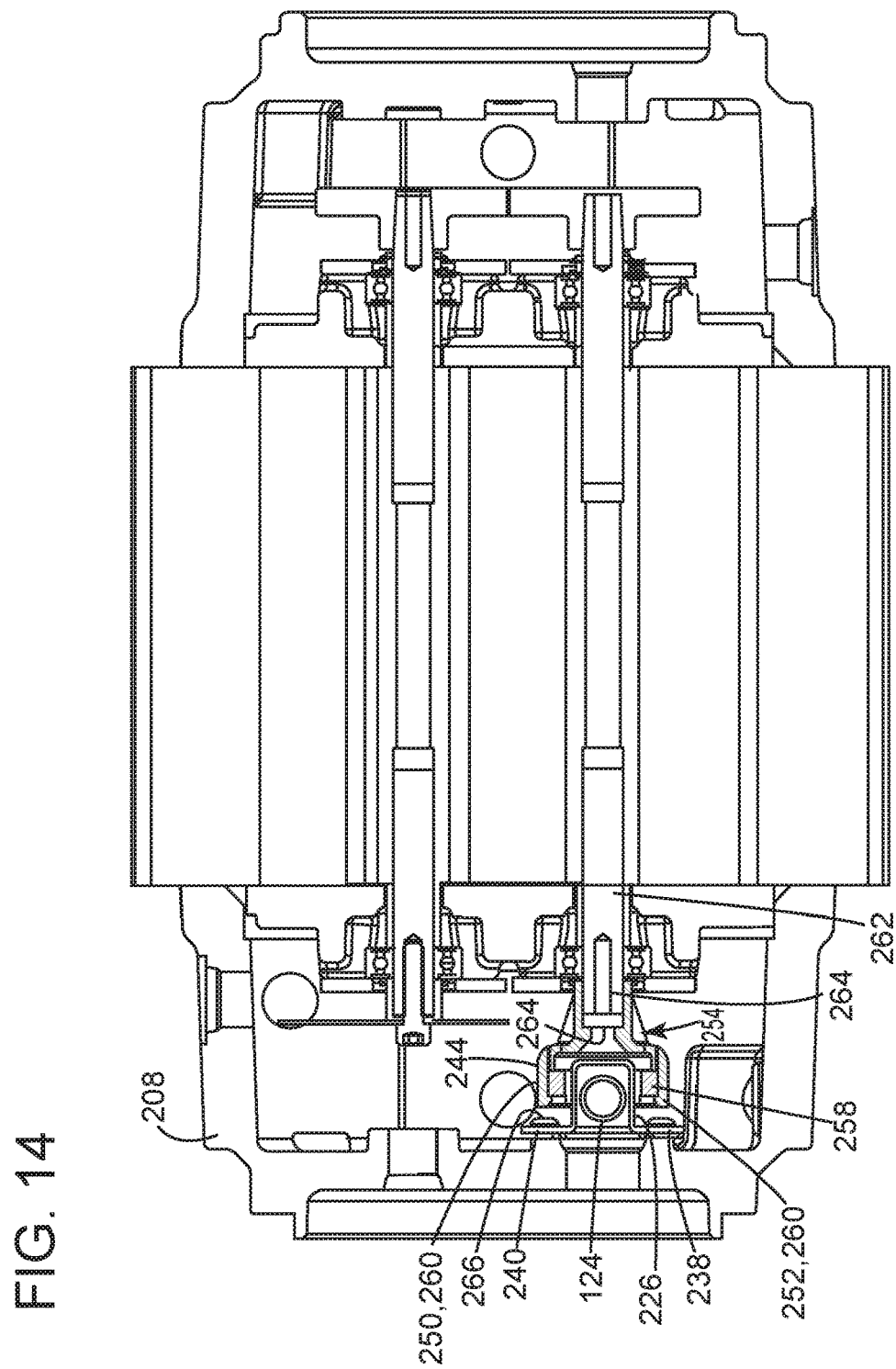
FIG. 14 depicts an elevation view of the cross-section of the example of FIG. 11.

FIG. 14 shows an elevation view of the cross-section of the structure 200 in assembled form taken at line 14-14 of FIG. 12. The extension cup 244 may insert at the tapered section 254 onto one end of an impeller shaft 262. The fit may be snug, as each of extension cup 244 and the impeller shaft 262 may be configured with features 264 for use to receive and secure a fastener (e.g., a bolt or screw). The magnet 258 is shown to install into the inner opening 248 so that the flexible tabs 250, 252 engage the detents 260. The fit between the peripheral outer wall 246 and the magnet 258 may be snug to prevent relative annular movement with the extension cup 224. The flexible tabs 250, 252 may help ensure this fit as well as to prevent longitudinal movement of the magnet 258 out of the extension cup 244. The flange 238 of the mounting bracket 226 may abut part of the second cover 208. Fasteners 266 may populate the openings 240 on the flange 238 to secure the mounting bracket 226 in place. As shown, the cup portion 242 extends into the inner opening 248 of the extension cup 224 to locate the second harvesting unit 124 inside of the magnet 258.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In light of the foregoing discussion, the embodiments herein incorporate improvements that are useful to harvest energy from revolution of the impellers on gas meters and related metrology hardware. These devices often reside in remote areas that lack electrical power so as to place emphasis on battery power for energy. Powering the electronics by battery power alone presents two common problems. First, the battery life was finite so the batteries had to be periodically replaced according to a maintenance schedule. Second, sometimes batteries died prematurely and unexpectedly, requiring an expensive emergency field replacement. In this regard, the examples below include certain elements or clauses one or more of which may be combined with other elements and clauses describe embodiments contemplated within the scope and spirit of this disclosure.

What is claimed is:

1. An apparatus, comprising: a meter device with a rotating component including a pair of impellers configured to rotate in response to a flowing fluid; an indexing unit coupled with the meter device and configured to process signals from the meter device resulting in values for measured parameters of a flowing fluid; and an energy harvester coupled to the rotating component, the energy harvester comprising a first harvesting unit and a second harvesting unit that co-operate to generate an electrical signal, the first harvesting unit configured to co-rotate with the pair of impellers, the second harvesting unit comprising a hollow, magnetic core disposed proximate the first harvesting unit, wherein the energy harvester comprises a field shaper disposed on the hollow, magnetic core, the field shaper configured to collapse magnetic flux lines towards an outer surface of the hollow, magnetic core.

2. The apparatus of claim 1, wherein the first harvesting unit comprises an annular, magnetic ring with magnetic poles diametrically disposed about an opening with a center axis.

3. The apparatus of claim 2, wherein the hollow, magnetic core comprises an elongate, cylindrical tube with a bore extending therethrough to form open ends, and wherein the elongate, cylindrical tube fits inside of the opening so as to orient the ends proximate the annular ring.

4. The apparatus of claim 1, wherein the field shaper comprises a bent wire with ends disposed in the hollow, magnetic core and a longitudinal segment outside of the hollow, magnetic core and coupled with the ends.

5. The apparatus of claim 1, wherein the field shaper comprises a plurality of bent wires, each having a longitudinal segment outside of the hollow, magnetic core and annularly spaced apart from one another about a longitudinal axis of the hollow, magnetic core.

6. The apparatus of claim 1, wherein the field shaper comprises a pair of magnetic end caps, one each disposed on ends of the hollow, magnetic core.

7. The apparatus of claim 1, wherein the hollow, magnetic core has open ends.

8. The apparatus of claim 1, wherein the hollow, magnetic core comprises a plurality of layers.

9. The apparatus of claim 1, wherein the first harvesting unit comprises multiple magnetic poles.

10. The apparatus of claim 1, wherein the first harvesting unit comprises a pair of magnetic poles diametrically opposed from one another.

11. The apparatus of claim 1, wherein the first harvesting unit forms an opening to receive the hollow, magnetic core.

12. The apparatus of claim 1, wherein the field shaper comprises a wire spaced apart from the outer surface of the hollow, magnetic core.

13. The apparatus of claim 1, wherein the field shaper comprises a plurality of wires spaced apart from the outer surface of the hollow, magnetic core.

14. A gas meter, comprising: a meter body comprising impellers configured to counter-rotate in response to material flow; and an energy harvester comprising: a first member comprising an annular ring magnet coupled with the impellers so as to co-rotate with the impellers, the annular ring magnet configured to generate a magnetic field; a second member comprising a magnetic core disposed proximate the magnetic field, the magnetic core forming a hollow tube; and a wire wound about the hollow tube so as to manifest an electrical signal in response to changes in the magnetic field relative to the hollow tube, wherein the hollow tube has a through bore forming a longitudinal axis that extends through diametrically opposed parts of the annular ring, and wherein the hollow tube has a peripheral wall that comprises a plurality of material layers that bound the longitudinal axis.

15. The gas meter of claim 14, wherein the hollow tube has open ends disposed proximate the annular ring magnet so that diametrically-opposed magnetic poles of the annular ring magnet pass in proximity to both open ends in response to rotation of the impellers.

16. The gas meter of claim 14, wherein the hollow tube is disposed inside of the annular ring magnet.

17. The gas meter of claim 14, further comprising leads coupled with the wire, wherein the leads conduct the electrical signal.

18. A gas meter, comprising: a meter body comprising impellers configured to counter-rotate in response to material flow; and an energy harvester comprising: a first member comprising an annular ring magnet coupled with the impellers so as to co-rotate with the impellers, the annular ring magnet configured to generate a magnetic field; a second member comprising a magnetic core disposed proximate the magnetic field, the magnetic core forming a hollow tube; and a wire wound about the hollow tube so as to manifest an electrical signal in response to changes in the magnetic field relative to the hollow tube; and a bent wire having ends extending into the hollow tube, wherein the ends are spaced apart from one another and a longitudinal segment outside of and spaced apart from the interior of the hollow tube.

19. The gas meter of claim 18, wherein the meter body comprises a central cylinder with end covers disposed on opposite ends, and wherein the annular ring magnet and the hollow tube are disposed in space formed by a recess in the end covers.

20. The gas meter of claim 19, further comprising:
- a bracket mounted to one of the end covers, the bracket supporting the magnetic core so as to arrange ends of the hollow tube inside of and proximate the magnet; and
- an extension cup with a peripheral wall forming an opening and a flexible tab, the opening and the tab configured to receive and secure the magnet in the extension cup.

* * * * *